Figure 1:
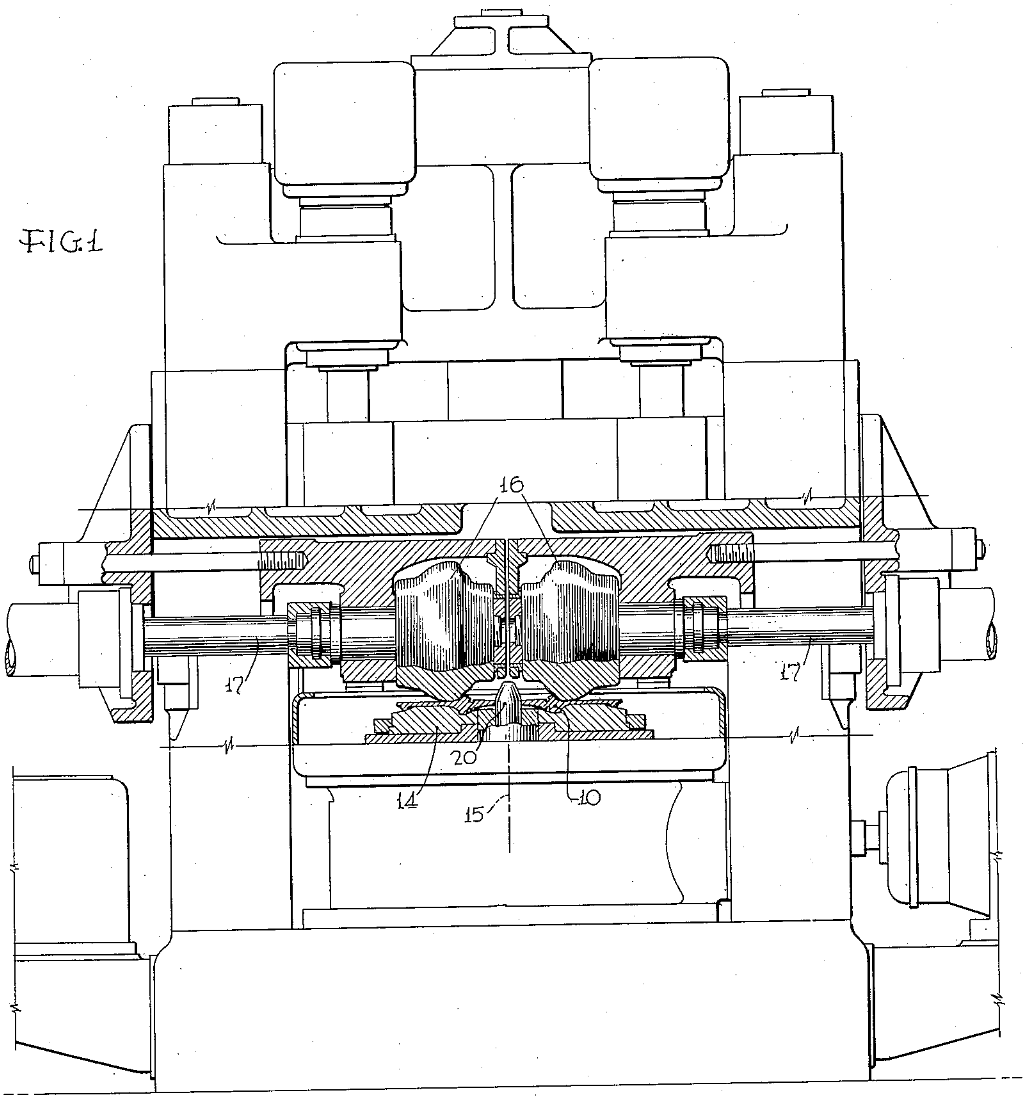
Figure 6:
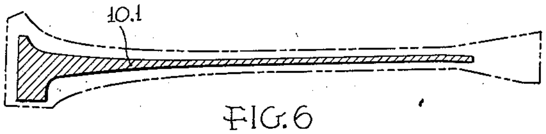
Figure 7:
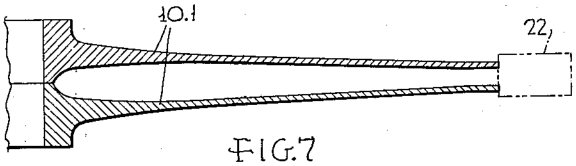
Figure 2:
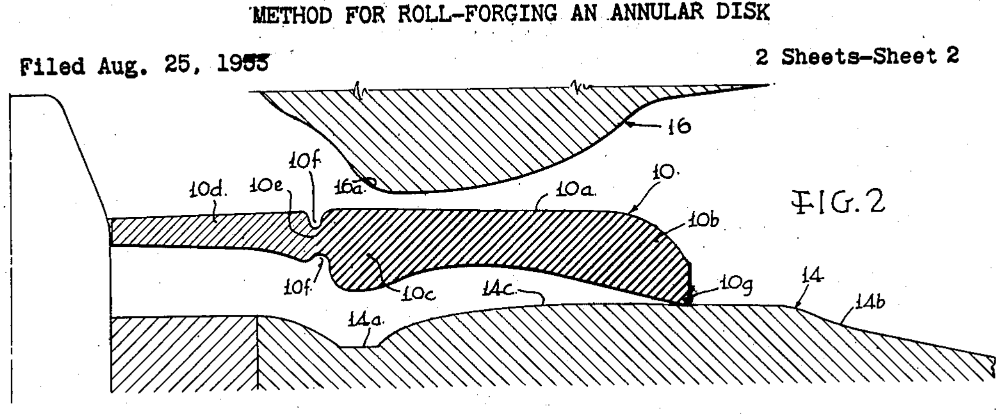
Figure 3:
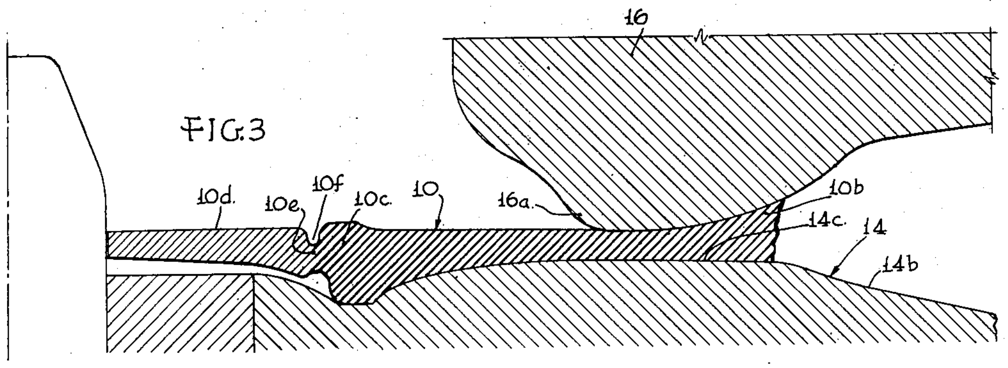
Figure 4:
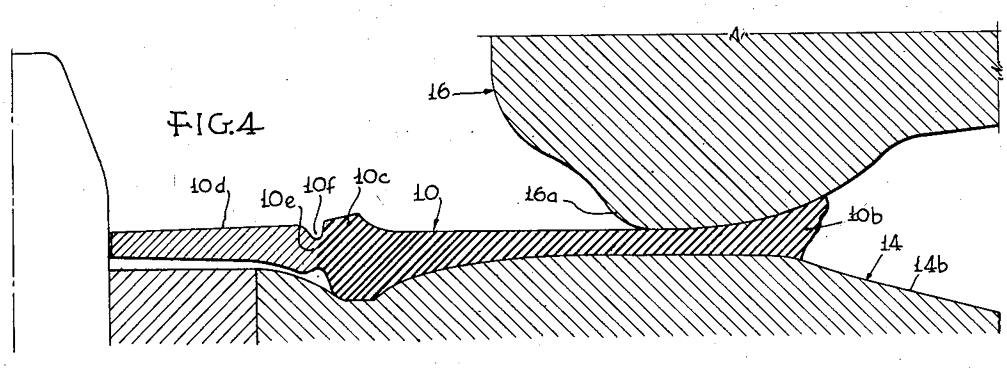
Figure 5:
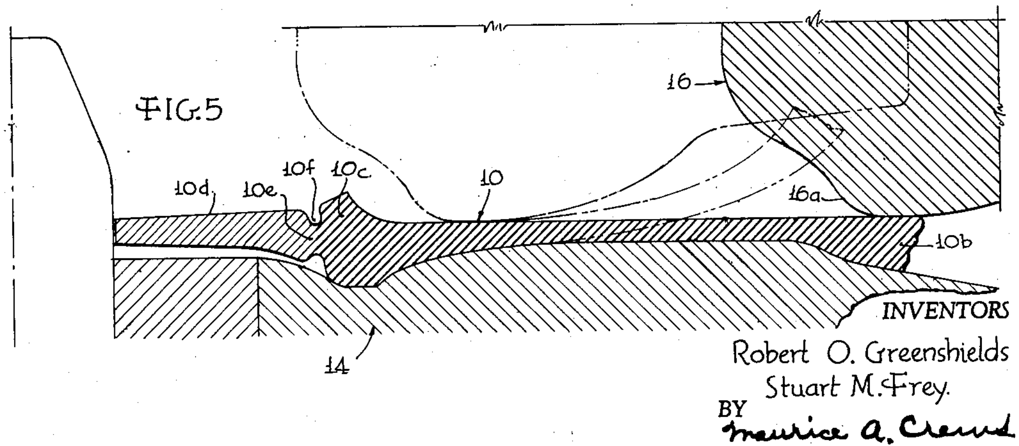

June 19, 1956 R. O. GREENSHIELDS ET AL 2,750,820

METHOD FOR ROLL-FORGING AN ANNULAR DISK

Filed Aug. 25, 1953 2 Sheets-Sheet 1

INVENTORS.
Robert O. Greenshields.
Stuart M. Frey.
BY
Maurice A. Crews
ATTORNEY

June 19, 1956 R. O. GREENSHIELDS ET AL 2,750,820

METHOD FOR ROLL-FORGING AN ANNULAR DISK

Filed Aug. 25, 1953 2 Sheets-Sheet 2

INVENTORS
Robert O. Greenshields
Stuart M. Frey

BY Maurice A. Crews
ATTORNEY